No. 689,853. Patented Dec. 31, 1901.
A. CLAUSING.
RATCHET CLUTCH MECHANISM.
(Application filed Apr. 13, 1901.)
(No Model.)
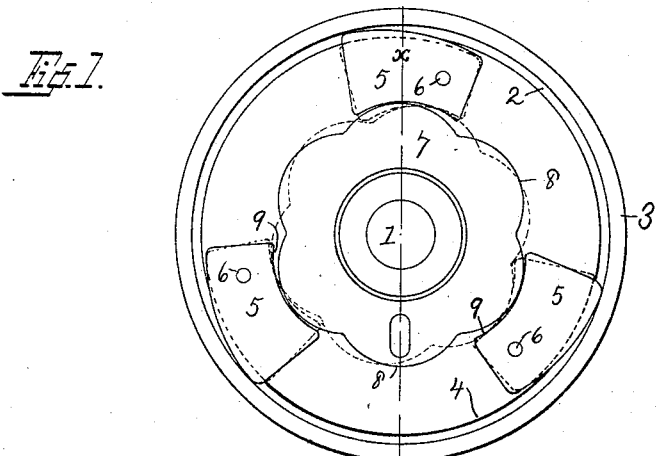
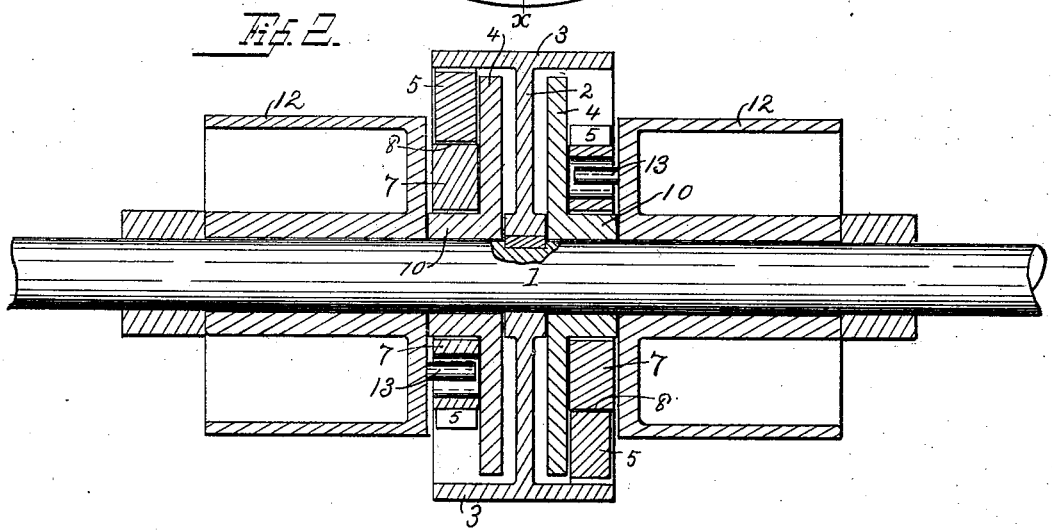
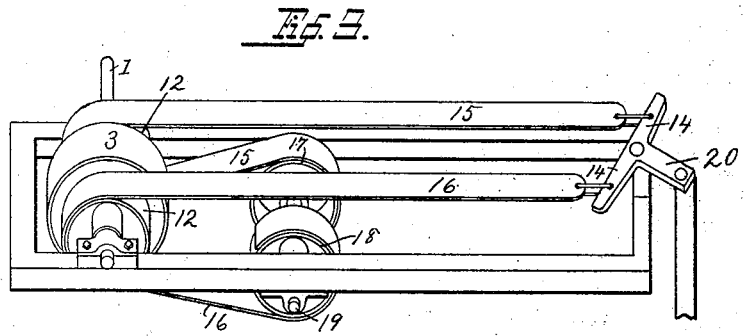
Witnesses:
Inventor
Albert Clausing
By Erwin E. Wheeler.
Attorneys.
THE NORRIS PETERS CO., PHOTO-LITHO., WASHINGTON, D. C.

UNITED STATES PATENT OFFICE.

ALBERT CLAUSING, OF MILWAUKEE, WISCONSIN.

RATCHET-CLUTCH MECHANISM.

SPECIFICATION forming part of Letters Patent No. 689,853, dated December 31, 1901.

Application filed April 13, 1901. Serial No. 55,690. (No model.)

*To all whom it may concern:*

Be it known that I, ALBERT CLAUSING, a citizen of the United States, residing at Milwaukee, county of Milwaukee, and State of Wisconsin, have invented new and useful Improvements in Ratchet-Clutch Mechanism, of which the following is a specification.

My invention relates to improvements in ratchet-clutch mechanisms.
The object of my invention is to provide a form of reciprocating clutch mechanism which can be operated with a minimum lost motion and which will be comparatively noiseless, regard being also had for reliability and simplicity of structure.

In the following description reference is had to the accompanying drawings, in which—

Figure 1 is a side view of my improved mechanism with the driving-pulley removed.
Fig. 2 is a sectional view of the complete device drawn on line $x\,x$ of Fig. 1. Fig. 3 is a perspective view of my invention, showing the driving connections.

Like parts are identified by the same reference-numerals throughout the several views.
1 is a shaft driven by my improved mechanism. This shaft is provided with a pulley having a web 2 and a rim 3, which in the construction shown projects laterally in both directions from the web. The pulley is keyed to or otherwise rigidly secured to the shaft. A dog-carrying disk 4 of less diameter than the pulley is mounted to rotate on the shaft within the pulley-rim 3 and is provided with a series of friction-dogs 5, pivotally secured to the disk at 6 and adapted when swung outwardly to engage against the inner surface of the rim 3, as shown in Fig. 1.

The disk 4 is provided with a hub 10, on which is loosely mounted a circular member 7, having its periphery formed with rounded or convex projections 8, curved in the arc of a circle having a shorter radius than that of the member 7. These convex projections 8 are adapted to engage in concave sockets 9 in the inner faces of the dogs 5, the sockets 9 being preferably formed in arcs of larger circles than those of the projections 8, whereby sufficient play is allowed in the central portions to permit the engagement of the projections 8 with the dogs on the opposite sides of the pivot ends when the member 7 is moved alternately to the front and rear. The dogs are pivoted near one end to the supporting-disk 4 and are so formed that when the member 7 occupies the position in which it is shown in Fig. 1 the dogs will be forced outwardly against the rim 3, as shown, while if the member is moved to the position in which it is shown by dotted lines in said figure the projections 8 will engage the dogs on opposite sides of the pivot ends and the dogs will be retracted, as also shown by dotted lines. The central aperture in the member 7 is of larger diameter than the hub 10, so that the member is allowed to move slightly side to side, and as three or more dogs are in engagement therewith at equal distances from each other it is obvious that the member will adjust itself so as to bear equally on all the dogs simultaneously without binding on the shaft or the hub 10 either in the position of engagement or release.

In the construction shown I have provided dog-supporting disks, dogs, and dog-actuating members 7 on each side of the centrally-driven pulley and have provided a driving-pulley 12 on each side, connected with its corresponding member 7 by means of a crank-pin 13. A reciprocating movement is communicated to the driving-pulleys and members 7 from an oscillating lever 14 by means of belts 15 and 16, which are connected with the opposing ends of the lever and passed around the pulleys 12 and the take-up pulleys 17 and 18 in opposite directions. The take-up pulleys are both mounted rigidly on the same shaft, and as the belts 15 and 16 are wound in opposite directions thereon and are actuated alternately by means of the lever 14 it is obvious that when one of the belts is being drawn off from its respective take-up pulley the motion of this pulley will be communicated to the other through their common supporting-shaft 19, and thus wind up the other belt.

From the above description of the construction of my device its operation will be readily understood. Motion may be communicated to the lever 14 through the medium of an arm 20 from a windmill or any other source of power, and the upward movement of one end of said lever will draw upon its corresponding belt, causing one of the members 7 to oscillate (through the medium of its driving-pulley 12) in a direction to push its corresponding dogs 5 outwardly into engagement with the rim 3 of the central or driven pulley, the member 7, with its plurality of projections 8, serving as a series of cams operating in divergent directions from a central point and neutralizing the reactionary pressure, which would otherwise cause the cam to bind upon its supporting-bearings. When one of the members 7 is thus actuated, the reverse movement is simultaneously communicated to the opposing member through the medium of the take-up pulleys 17 and 18, their supporting-shaft 19, and the belts, retracting its corresponding dogs, as above explained. When the lever 14 is moved in the opposite direction, the movement of the belts, driving and take-up pulleys, dog-actuating members, dogs, and their supporting-disks will be reversed, the dogs engaging with the rim 3 during the preceding movement being retracted, while those which were retracted during the preceding movement will be forced outwardly against the rim 3, the latter being thus continuously driven in one direction.

It will be understood that I do not limit the scope of my invention to the specific means shown and described for actuating the members 7.

What I claim as new, and desire to secure by Letters Patent, is—

1. In a device of the described class, the combination of a shaft; a pulley mounted thereon; an oscillatory dog-supporting disk, adapted to move independently of the pulley, and a series of dogs adapted to engage the pulley; a dog-actuating member, also independent of the pulley, and adapted to push the dogs into simultaneous engagement with the pulley when moved in one direction, said dogs being arranged in opposition, whereby the reactionary pressure of the actuating member is exerted upon the opposing dog or dogs.

2. In a device of the described class, the combination of a shaft; a pulley mounted thereon; an oscillatory dog-supporting disk mounted to rotate independently of the pulley; a series of dogs pivotally secured to the disk and adapted to engage the pulley; an actuating member, having projections loosely engaging said dogs, and adapted to bear against the latter on opposite sides of the line of centers of the shaft and dog-supporting pivot-pins when the actuating member is oscillated.

3. In a device of the described class, the combination of a shaft; a pulley mounted thereon; an oscillatory disk mounted on the shaft within the pulley-rim; dogs pivotally secured to the disk, and adapted to be pushed outwardly into frictional contact with the rim; a dog-actuating member, having rounded projections engaged in suitable recesses in the dogs, and adapted, when oscillated, to push against said dogs alternately on opposite sides of the line of centers of the shaft and the respective pivot-pins, said actuating member being supported by the dogs when the latter are in engagement with the pulley-rim; together with suitable means for oscillating the dog-actuating member.

4. In a device of the described class, the combination of a shaft; a pulley mounted thereon; a disk mounted on the shaft at the side of the pulley; dogs pivotally secured to the disk and provided with concave inner faces; an independently-movable dog-actuating member, having projections loosely engaging the concave faces, and adapted to communicate the movement of the member to actuate the dogs toward, and away from, the rim of said pulley, in accordance with the direction of the movement of said member, said dogs being arranged to support said member when in engagement with the rim of the pulley.

5. In a device of the described class, the combination of a shaft; a pulley mounted thereon; a disk mounted on the shaft at the side of the pulley; dogs having one end pivoted to the disk, and arranged for frictional engagement with the pulley when moved outwardly; an independently-movable actuating member interlocked with said dogs, and adapted to be supported thereby; and means for oscillating said member, whereby the dogs are actuated in two directions and engage and disengage from the pulley.

6. In a device of the described class, the combination of a shaft; a pulley mounted thereon; a set of pivotally-supported dogs mounted on a suitable carrier, independent of the pulley; an actuating member loosely engaged with, and adapted to be supported by, said dogs, the engaging portions of said member being adapted to shift from one portion of the dogs to the other when said member is oscillated.

7. In a device of the described class, the combination of a shaft; a pulley mounted thereon; a set of pivotally-supported dogs mounted on a suitable carrier, independently of said pulley, but within the rim thereof; a hub connected with the carrier; a dog-actuating member mounted on said hub, and having rounded projections loosely interlocked with the dogs, and adapted, when moved in one direction, to force the dogs into frictional engagement with the rim of said pulley; and means for oscillating the member.

8. In a device of the described class, the combination of a shaft; a pulley mounted thereon; a dog-supporting carrier independently mounted on the shaft at each side of the pulley; dogs pivotally secured to the carrier, a hub connected with the carrier; a dog-actuating member loosely mounted on the hub, and adapted to shift from side to side thereon, said member having projections loosely interlocked with the dogs, and adapted, when said member is moved in one direction, to force the dogs into frictional engagement with the rim of said pulley, the dogs being arranged to support said member independently of the hub, when in engagement with the pulley-rim.

9. In a device of the described class, the combination of a shaft; a pulley mounted thereon; a dog-supporting carrier independently mounted on the shaft at each side of the pulley; a set of dogs pivotally mounted on each carrier and adapted to frictionally engage said pulley; a dog-actuating member mounted on each carrier, and independently movable thereon, and having projections loosely interlocked with the dogs on its respective carrier; and driving-pulleys for crank-pin connections with said dog-actuating members; take-up pulleys; actuating-belts oppositely wound on the opposite driving and take-up pulleys, respectively; and means for oppositely actuating said belts.

In testimony whereof I affix my signature in the presence of two witnesses.

ALBERT CLAUSING.

Witnesses:
JAS. B. ERWIN,
C. L. ROESCH.